United States Patent [19]

Laughlin et al.

[11] 4,054,794
[45] Oct. 18, 1977

[54] OPTICAL COMMUNICATIONS LINK

[75] Inventors: Richard H. Laughlin, Richardson; Peter Sorensen, III, Garland, both of Tex.

[73] Assignee: Varo, Inc., Garland, Tex.

[21] Appl. No.: 557,529

[22] Filed: Mar. 12, 1975

[51] Int. Cl.² .................... H04B 9/00; H04N 7/04
[52] U.S. Cl. .................... 250/199; 332/7.51; 358/143
[58] Field of Search .............. 250/199, 216, 551, 226; 178/DIG. 1, 7.2, 7.1, 7.3; 329/144; 332/7.51; 343/201, 202, 207; 325/46, 346, 47; 350/148, 311

[56] References Cited

U.S. PATENT DOCUMENTS

| 2,086,791 | 7/1937 | Dresler | 250/226 |
|---|---|---|---|
| 2,400,073 | 5/1946 | Cawein | 178/7.3 |
| 2,949,605 | 8/1960 | Graziano et al. | 343/202 |
| 2,982,859 | 5/1961 | Steinbrecher | 250/205 |
| 3,284,633 | 11/1966 | Hathaway | 250/199 |
| 3,302,027 | 1/1967 | Fried et al. | 250/199 |
| 3,305,627 | 2/1967 | Krause | 325/46 |
| 3,384,837 | 5/1968 | Toussaint et al. | 332/3 |
| 3,401,266 | 9/1968 | Cooke-Yarborough | 250/209 |
| 3,478,215 | 11/1969 | Winstel et al. | 250/211 |
| 3,488,586 | 1/1970 | Watrous et al. | 324/96 |
| 3,617,750 | 11/1971 | Walker | 250/199 |
| 3,674,925 | 7/1972 | Heckman, Jr. | 178/6.8 |
| 3,705,986 | 12/1972 | Sanders et al. | 250/199 |
| 3,761,184 | 9/1973 | McLaughlin, Jr. | 356/186 |
| 3,778,728 | 12/1973 | Nupp | 329/110 |
| 3,899,429 | 8/1975 | Ueno et al. | 250/199 |
| 3,917,906 | 11/1975 | Johnson et al. | 325/47 |
| 3,931,512 | 1/1976 | Kent et al. | 250/199 |

OTHER PUBLICATIONS

"Closed Circuit Television Systems-Color and Monochrome"—R.C.A. Service Company, pp. 207-210, copyright 1958.
Simplified Modern Filter Design — Philip R. Geffe, 1963, pp. 1, 2, 6-11, 123.

Primary Examiner—Robert L. Griffin
Assistant Examiner—Marc E. Bookbinder
Attorney, Agent, or Firm—Richards, Harris & Medlock

[57] ABSTRACT

The specification discloses a wireless optical communications link which includes a transmitter housing having circuitry for receiving electrical audio and video signals. A light emitting diode is mounted in the transmitter housing for generating a directional beam of light. Circuitry modulates the beam of light in accordance with the audio and video signals. A receiver housing is adapted to be located remote from the transmitter housing and includes an aspheric Fresnel lens for receiving and focusing the beam of light. A photodiode is mounted in the receiver housing for generating electrical output signals in response to the received beam of light. Circuitry is responsive to the electrical output signals for reconstructing the audio and video signals at the remote location.

6 Claims, 8 Drawing Figures

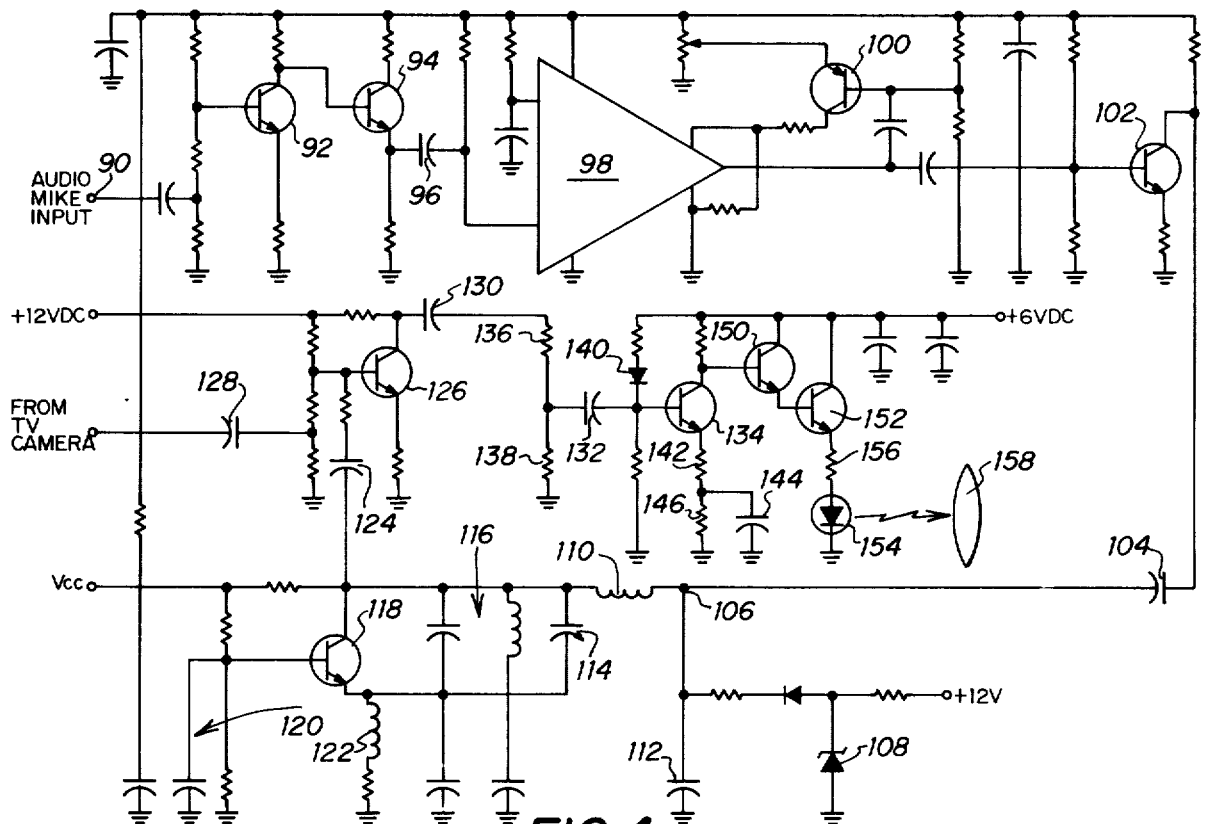
FIG. 4
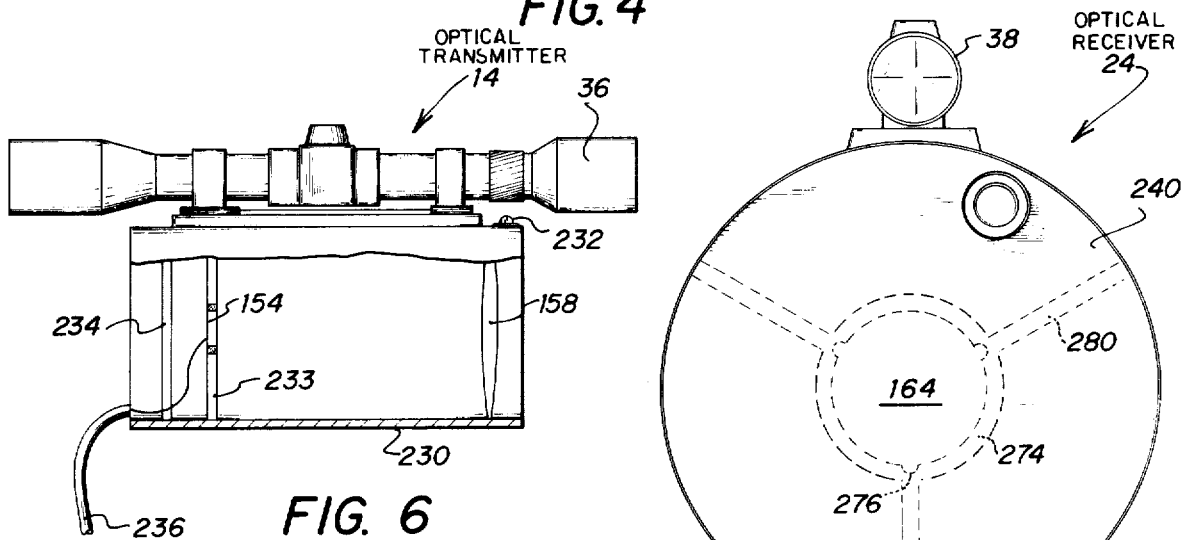
FIG. 6
FIG. 7

OPTICAL COMMUNICATIONS LINK

FIELD OF THE INVENTION

This invention relates to wireless communications links, and more particularly relates to an optical communications link for transmitting video and audio information over a modulated light beam.

THE PRIOR ART

It has been heretofore known to transmit video and audio information via an optical communications link by modulating the output of a light source such as a laser. However, such previously developed communications links have not been completely satisfactory with respect to resolution and range. Such prior communications link devices have also often required relatively expensive and bulky lens systems, as well as expensive and complex sources of light such as lasers.

A need has thus arisen for an optical communications link which is sufficiently portable, yet which has adequate range and resolution, for use in remote electronic news gathering, surveillance, and the like. Such uses require a lightweight system which can be handcarried to remote locations, and yet which is not so fragile so as to create maintenance problems. Such a remote optical communications link should not require an excessively large power supply, and yet should be able to provide optimum resolution at ranges of at least 1,000 feet.

SUMMARY OF THE INVENTION

The present invention eliminates or reduces the problems heretofore associated with prior optical communications links. The present invention comprises a wireless link for transmitting electrical audio and video signals which includes a source of a directional light beam, the energization of which is modulated with the audio and video signals to thereby modulate the resulting light beam. A receiver station detects the modulated light beam at a remote location and generates electrical output signals representative of the audio and video signals.

In accordance with a more specific aspect of the invention, a remote television news gathering communications link includes circuitry for receiving electrical audio and video signals from a remote television camera and microphone. A light emitting diode is energized for generating a directional light beam. Circuitry modulates the energization of the light emitting diode in response to the electrical audio and video signals. Circuitry is provided for detecting the light beam at a remote location and for generating electrical output signals representative of the audio and video signals. Circuitry is then provided for transmitting the electrical output signals to a central station for rebroadcast.

In accordance with yet another aspect of the present invention, a receiver of modulated light in a communications link includes a Fresnel lens for receiving and focusing modulated light. A photodiode is mounted adjacent the Fresnel lens for generating an electrical signal representative of the modulated light. Circuitry is responsive to the electrical signals for generating video signals.

In accordance with another aspect of the invention, a wireless communications link includes a transmitter housing having circuitry for receiving electrical audio and video signals. A light source generates a beam of light from the transmitter housing. Circuitry modulates the beam of light with the audio and video signals. A first lens in the front of the transmitter housing focuses the modulated beam of light. A receiver housing includes a second lens for receiving and focusing the beam of light. A photodiode is mounted in the receiver housing for generating electrical outputs of signals in response to the beam of light. Circuitry is responsive to the electrical output signals for reconstructing the audio and video signals.

DESCRIPTION OF THE DRAWINGS

For a more complete understanding of the present invention and for further objects and advantages thereof, reference is now made to the following description taken in conjunction with the accompanying drawings, in which:

FIG. 4 is an electrical schematic diagram of the transmit circuitry of the invention;

FIG. 6 is a partially sectioned side view of the transmitter of the invention;

FIG. 7 is a rear view of the receiver housing of the invention; and

DESCRIPTION OF THE PREFERRED EMBODIMENT

Figure 1:
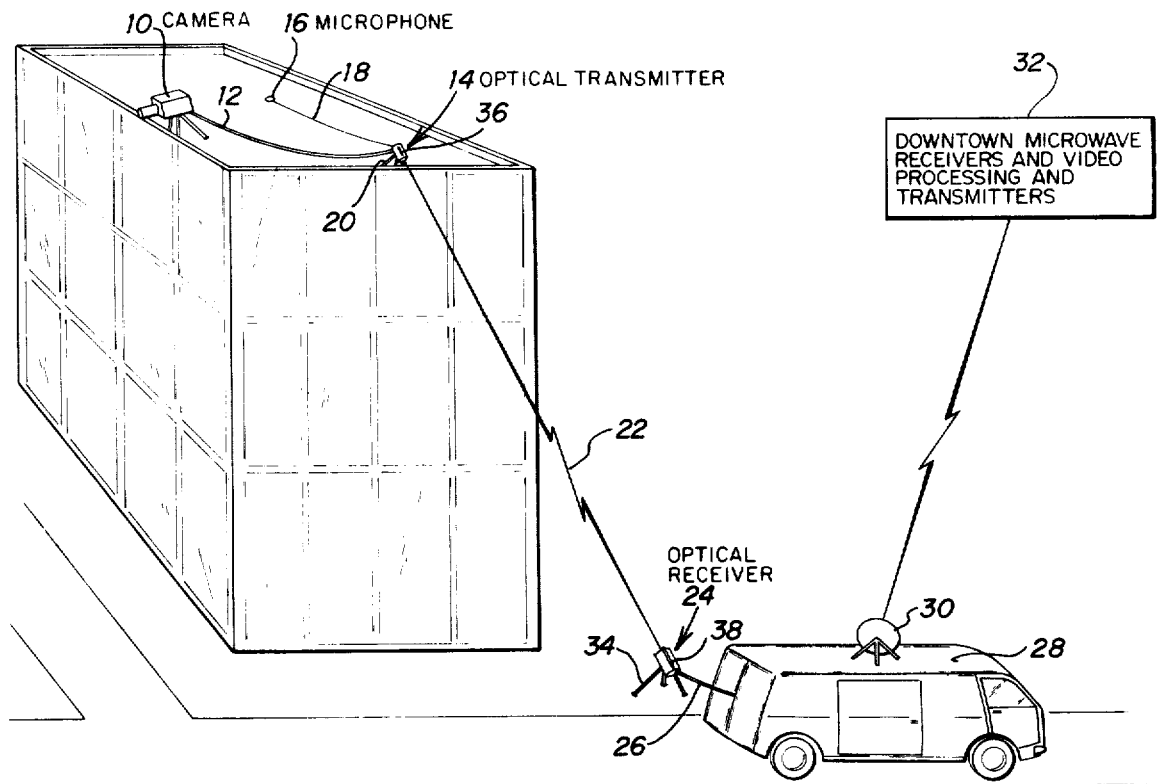
FIG. 1 is a somewhat diagrammatic illustration of a typical use of the present optical communications link in an electronic news gathering environment.

Referring to FIG. 1, a somewhat diagrammatic illustration of a typical use of the present optical link is illustrated. A conventional portable television camera 10 is disposed in a remote area to record a news event or the like. Electrical signals generated by the camera 10 are applied through a cable 12 to the optical transmitter housing 14 of the present invention. A microphone 16, which will generally be hand-held, is positioned adjacent the camera 10 for detecting audio associated with the video. Electrical audio signals are applied from the microphone 16 through a cable 18 to the optical transmitter housing 14.

The optical transmitter housing 14 is normally mounted on a tripod 20 and is positioned to direct a modulated light beam 22 to an optical receiver housing 24. As will be subsequently described, the modulated light beam 22 contains both the video and audio data generated by the television camera 10 and the microphone 16. The optical receiver housing 24 detects the modulated light beam and generates electrical signals representative of the video and audio signals and applied electrical signals through a cable 26 to microwave transmission circuitry located in mobile vehicle 28. If desired, a television monitor may be located in the mobile van 28 in order to monitor the video ouput of the camera 10. Microwave signals are transmitted from a transmitting antenna 30 mounted on the vehicle 28 to a remote microwave receiver 32. At receiver 32, the microwave signals are processed to derive the audio and video signals, whereupon signals are transmitted by cable to a television antenna for rebroadcasting.

The optical receiver housing 24 is normally mounted on a tripod 34 to provide stability thereto. The optical transmitter housing 14 includes a telescopic sight 36, and the optical receiver housing 24 also includes a telescopic sight 38. The operators may align the transmitter housing 14 and the receiver housing 24 by sighting through the telescopic sight and adjusting the position of the housings into alignment. As will be subsequently described, flashing strobe beacons may be placed on the housings in order to assist in the alignment procedure.

It may thus be seen that the present system provides a wireless communications link to transmit both video and audio data in environments wherein it is impractical or impossible to lay out heavy cable between a television camera and a remote mobile transmitter. It will be understood that the present optical communications link may also be useful for other purposes, such as for surveillance situations and the like.

Figure 2:
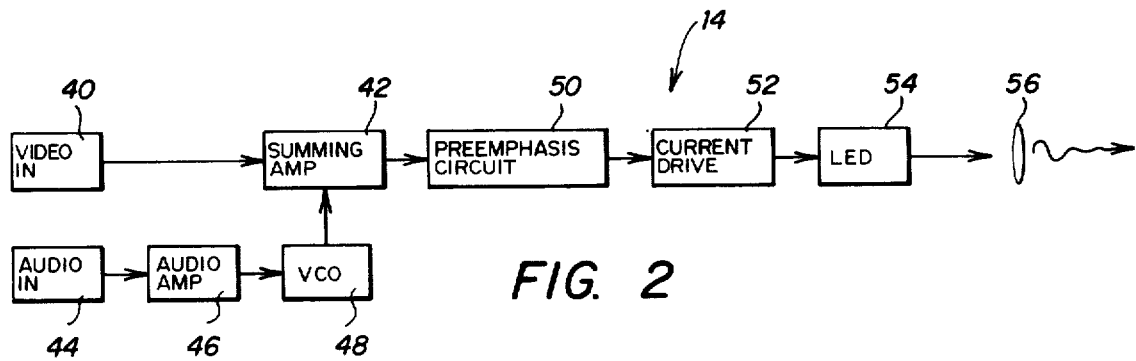
FIG. 2 is a block diagram of the transmitter of the present optical communications link.

FIG. 2 illustrates a block diagram of the electronic circuitry of the optical transmitter housing 14. Electrical video signals from the television camera 10, or for another suitable video source, are applied to an input circuit 40 which conditions the video signals and applies the video signals to a summing amplifier 42. The electrical audio signals are applied to an input circuit 44, which applies the signals through an audio amplifier 46. The output of the amplifier 46 controls a voltage controlled oscillator (VCO) 48, which generates an output frequency proportional to the input audio signal.

The output of the VCO 48 is applied to the summing amplifier 42, which sums the video input and the frequency modulated audio input. The summed output waveform is applied from the amplifier 42 to a preemphasis circuit 50 which emphasizes the higher frequencies in the signal and deemphasizes the lower frequencies. The preemphasis circuit thus tends to flatten the LED drive in order to provide maximum performance for the video signal. The output of the circuit 50 is applied to a current drive 52 which drives the light emitting diode (LED) 54. The LED 54 generates a modulated light which is focused by an aspheric condenser lens 56 to form a directional modulated light beam. As will be subsequently described, the light beam is provided with baseband modulation for the video, along with AM/FM subcarrier modulation for the audio signals.

Figure 3:
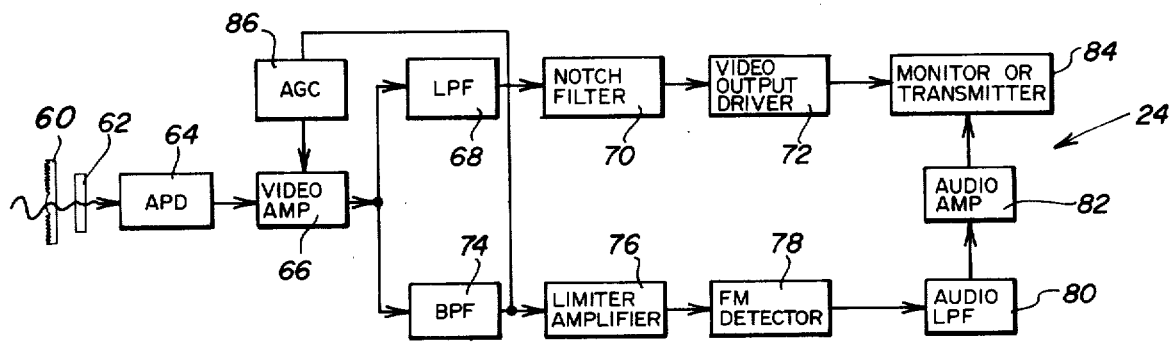
FIG. 3 is a block diagram of the receiver of the present system.

FIG. 3 illustrates a block diagram of the optical receiver housing 24 according to the invention. The directional light beam transmitted from the transmitter housing 14 is applied through a Fresnel lens 60 which focuses the beam and applies it through a filter 62. The Fresnel lens, as is known, comprises a relatively flat lens with a plurality of concentric grooves formed therein. The grooves shown in FIG. 3 are diagrammatically enlarged in order to illustrate the construction of the lens. The Fresnel lens is of importance in that it is relatively thin and lightweight, and eliminates the requirement of the large heavy and expensive focusing lens required in prior devices. The filter 62 comprises a dye filter in order to reduce ambient background signals.

The filtered light beam is applied to an avalanche photodiode 64 which operates to generate an electrical output signal proportional to the received modulated light beam. Electrical output signals from the photodiode 64 are applied to a video amplifier 66 which operates as a phase splitter to generate video and audio outputs. The video output is applied through a low pass filter 68 and a notch filter 70 to a video output driver 72.

The audio signals are applied through a bandpass filter 74 to a limiter amplifier 76.

The output of amplifier 76 is applied to an FM detector 78 which applies a signal through an audio low pass filter 80 to an audio amplifier 82. The outputs of the video output driver 72 and the audio amplifier 82 are applied to a TV monitor 84 or to a transmitter for transmission to a remote central location as shown in FIG. 1. A signal from the audio bandpass filter 74 is applied to an automatic gain control circuit (AGC) 86 which applies automatic gain control signals to the video amplifier 66.

FIG. 4 is a schematic diagram illustrating in greater detail the transmitter circuitry of FIG. 2. The audio output from a microphone is applied to the audio mike input terminal 90 and is applied through a feedthrough capacitance and termination resistors to the base of a transistor 92. Transistor 92 is connected in the common emitter configuration to provide gain and provides an output to the base of an emitter follower transistor 94. The emitter of transistor 94 is connected through a decoupler capacitor 96 to the input of an audio amplifier 98. Amplifier 98 may comprise, for example, an LM270 audio amplifier which is subject to automatic gain control. Automatic gain control is provided to amplifier 98 by a transistor 100.

The output of amplifier 98 is applied to a transistor 102 which operates as a common emitter amplifier with a gain of from 1.2 to 1.3. The output of transistor 102 is applied through a decoupler capacitance 104 to a voltage controlled oscillator (VCO). Point 106 has approximately 4.5 DC volts which is developed through a zener diode 108 and associated circuitry. The voltage on point 106 increases or decreases as the audio level applied thereto changes. The voltage at point 106 thus varies by a maximum of 2 volts peak-to-peak, or from 3.5 to 5.5 volts. Inductor 110 and capacitor 112 operate to block passage of high frequencies. DC voltage is thus applied to a voltage variable capacitor 114. As the voltage applied to point 106 changes, the value of the capacitor 114 changes. An L-C tank circuit 116 operates in conjunction with the varying capacitance 114 to vary the frequency generated by an oscillator transistor 118.

The basic frequency of the oscillator transistor 118 is determined by an RC circuit 120. An rf choke 122 blocks the generation of rf by producing emitter degradation of the transistor 118. The output from the VCO circuit is generated from the collector of transistor 118 and is applied through capacitor 24 to the base of a summing amplifier transistor 126. The output of the VCO in the preferred embodiment is 7 MHz, with a signal variance of plus or minus 50 Kc.

The output from the remote TV camera is applied through a capacitance 128 and divider resistances to the base of the summing amplifier transistor 126. The video and audio signals are thus summed at the base of transistor 126 and the combined audio and video signals are applied through decoupling capacitors 130 and 132 to the base of a transistor 134. This circuit operates as a preemphasis amplifier in order to provide preemphasis to the high frequencies and to deemphasize the low frequencies, such that the drive to the light emitting diode is flattened to provide optimum performance.

The voltage divider comprised of resistors 136 and 138 is provided such that the input voltage to transistor 134 is essentially constant and approximately 0.7 volts. A diode 140 is tied to the base of transistor 134 for temperature compensation of the light emitting diode.

The emitter of transistor 134 feeds through a resistance 142 to a capacitance 144. A resistance 146 is tied between resistor 142 and circuit ground. When the impedance of the capacitor 144 becomes greater than the impedance of resistance 146, voltage for emitter degradation is developed across resistor 146. As the impedances of capacitor 144 and resistor 146 become equal, the capacitor becomes the gaining network and therefore the impedance increases with frequency and the frequency response increases.

The output of the preemphasis transistor 134 is applied to a Darlington emitter follower configuration comprised of transistors 150 and 152 which operate as a current driver for the light emitting diode (LED) 154. A low ohmic resistance 156 is connected in series to the LED 154 and the emitter of transistor 152 in order to limit the current applied to the LED 154. LED 154 thus generates a modulated light beam which is applied through an aspheric lens 158 to generate a directional light beam for transmission of the audio and video information. Lens 158 may comprise, for example, 68 millimeter diameter aspheric lens No. A-17-141-20 manufactured and sold by Oriel Corporation of America, Stamford, Conn.

The preemphasis network operates to flatten the drive to the LED 154, such that at 5 MHz, the response is 3dB down. The maximum flat frequency of the LED 154 is approximately 2 MHz in order to give maximum performance for the LED when transmitting the video waveforms. It has been found that a gallium arsenide LED having 8.3 milliwatts output power provides excellent operation of the present system. The TIXL13 light emitting diode manufactured and sold by Texas Instruments Incorporated of Dallas, Tex. has been found to work well for this purpose.

An important aspect of the present invention is that the excitation drive to the LED is modulated with the audio and video information, and therefore the resulting light output of the LED is not required to be modulated. The baseband of the light beam is thus modulated with the video information, while FM/AM modulation of a subcarrier of the light beam carries the audio data. The baseband modulation is accomplished between approximately 30 Hz and 4.5 MHz, while the subcarrier modulation occurs at 7 MHz ± 50 KHz.

Figure 5:
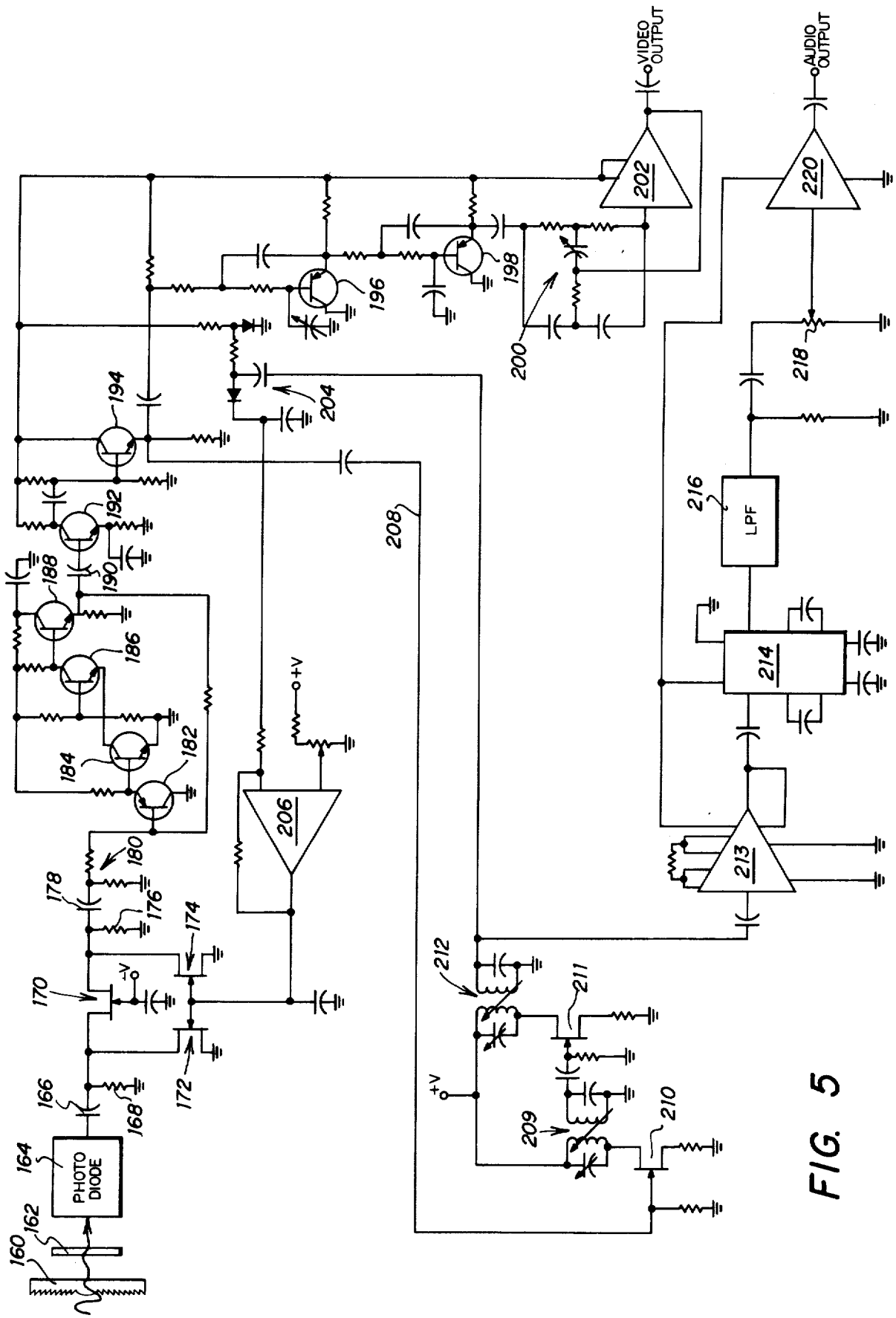
FIG. 5 is an electrical schematic diagram of the receiver circuitry of the invention.

Referring to FIG. 5, a schematic of the receiver circuitry of the invention is illustrated. The modulated light beam transmitted by the transmitter shown in FIG. 4 is received by a Fresnel lens 160, which comprises a large number of concentric surfaces which provides the equivalent of a conventional aspheric lens without the attendant size and bulkiness. As is known, the curvature of the grooves in the Fresnel lens affords incident beam refraction approximating that of a conventional lens. A suitable Fresnel lens for use with the present invention is the Model No. 24-0077 Fresnal lens sold by Ealing Optics of Cambridge, Mass., and reduced to a 7.2 inch diameter.

A dye filter 162 is positioned behind the Fresnel lens in order to reduce the ambient background signal. The modulated light is directed upon a silicon avalanche photodiode 164 which generates an output signal proportional to the modulated light beam. An avalanceh photodiode suitable for use with the present invention is the Model No. TIXL79 Silicon Avalanche Diode with transimpedance amplifier and voltage regulator and manufactured and sold by Texas Instruments Incorporated of Dallas, Tex. The photodiode 164 generates an output signal which is applied through decoupling capacitor 166 to a load resistor 168 which operates to reduce reflection.

The signal is applied to an FET 170 which is interconnected with second and third FETs 172 and 174, in order to form an automatic gain control (AGC) network. The output of the AGC network is applied to a terminator resistance 176 and through a decoupling capacitor 178 to a termination and bias resistance network 180. The signal is applied to the base of a transistor 182 which is connected in an emitter follower configuration. The output of transistor 182 is applied to a cascode amplifier comprising transistors 184 and 186 for amplification. The signal is then applied to an emitter follower transistor 188 and through a decoupler capacitance 190 to the base of a common emitter amplifying transistor 192. The output of transistor 192 is applied to a unity gain amplifying transistor 194 which acts as a phase splitter to provide video and audio outputs.

The video signal is applied to a low pass filter comprising transistors 196 and 198, along with associated resistances and capacitances to form a four-pole Butterworth low pass filter. The lower limit of the filter is approximately ten cycles per second, while the filter provides a response approximately 3dB down at 5 MHz. The output of the low pass filter is applied to a notch filter 200 which has the deepest notch at 7 MHz. The output of the notch filter is applied to an output driver 202 which may comprise a LH002 Line Driver. The output of driver 202 comprises the video output which may be applied to a television monitor or to a microwave transmitter for transmission to a central rebroadcasting station.

An AGC signal is generated from the 7 MHz subcarrier, as will be subsequently described, and is applied through a capacitor network, with diode rectifiers providing a DC level thereto. The AGC feedback signal is applied to an input of an operational amplifier 206 which is utilized as a comparer to compare the input voltage with a reference voltage applied to the second input of the amplifier 206. The output of amplifier 206 applies an input to the gates of FETs 172 and 174 in order to provide a high sample rate AGC for input of the circuitry.

The audio signal is applied from the emitter of transistor 194 via lead 208 to a bandpass filter comprising an amplifier tuned at 7 MHz, with a 50 KHz bandwidth. The tuned amplifier comprises a tuned L-C tank 209 connected to an FET 210. A second FET 211 is connected to tank 209 and includes a second tuned L-C tank 212. The output of tank 212 has all video filtered therefrom, due to the sharply tuned amplifier.

The output of the bandpass filter is applied to the capacitor network 204 as a highly sampled AGC signal. The output of the tuned tank 212 is also applied to the input of a limiter amplifier 213 which may comprise, for example, a CA3023 RCA wideband amplifier. Amplifier 213 operates to limit the signal to prevent distortion. The output of the amplifier 213 is applied to an FM detector 214 which may comprise, for example, an NE560 Phase Lock Loop which locks on and tracks the input frequency. The detector 214 thus generates a shifting DC signal which is proportional to the frequency applied thereto. The output of the FM detector is applied to a low pass filter 216 which is constructed identically to the four-pole Butterworth filter formed by transistors 196 and 198.

The output of filter 216 is applied to an audio amplifier including a voltage control resistance 218 and an amplifier 220 which may comprise, for example, an LM380 two watt audio amplifier. The output of amplifier 220 comprises the audio output which may be applied to a speaker of a TV monitor or to a microwave station for transmission to a rebroadcast station.

FIG. 6 illustrates a partially sectioned side view of the optical transmitter housing 14 of the invention. The transmitter includes a cylindrical housing 230 which supports the telescopic sight 36 along the top thereof. A flashing strobe beacon 232 is placed on the top portion of the housing 230 in order to generate a strobe light beacon in order to assist in the alignment at night and when the device is utilized in dark windows and the like. The focusing lens 158 is positioned in the front of the housing 230. The light emitting diode 154 is mounted in an insulating member disposed in the center of a printed circuit board 233. A second printed circuit board 234 is provided for the electronic components shown in FIG. 4. Power is applied to the transmitter unit via an electrical cord 236.

The present invention is provided with a range of from 1,000 feet to 1,500 feet during the day. During the night, the range increases from ½ mile to 1 mile. With the present optical transmitter, an output power of approximately 8 milliwatts is provided, with a field of view of 1°.

Dimensions for the transmitter housing may comprise, for example, a diameter of 3½ inches, and a length of 6¼ inches, with a weight of approximately 3 pounds. The unit is constructed in a weathertight construction in order to prevent dust and debris from accumulating in the device, therefore allowing the device to be used in all types of weather. The device is sufficiently light to be hand-held when desired. The present transmitter provides a nominal signal-to-noise of 50 dB at 1,000 feet and therefore allows video and audio data to be transmitted without wires over a substantial distance with excellent resolution.

Figure 8:
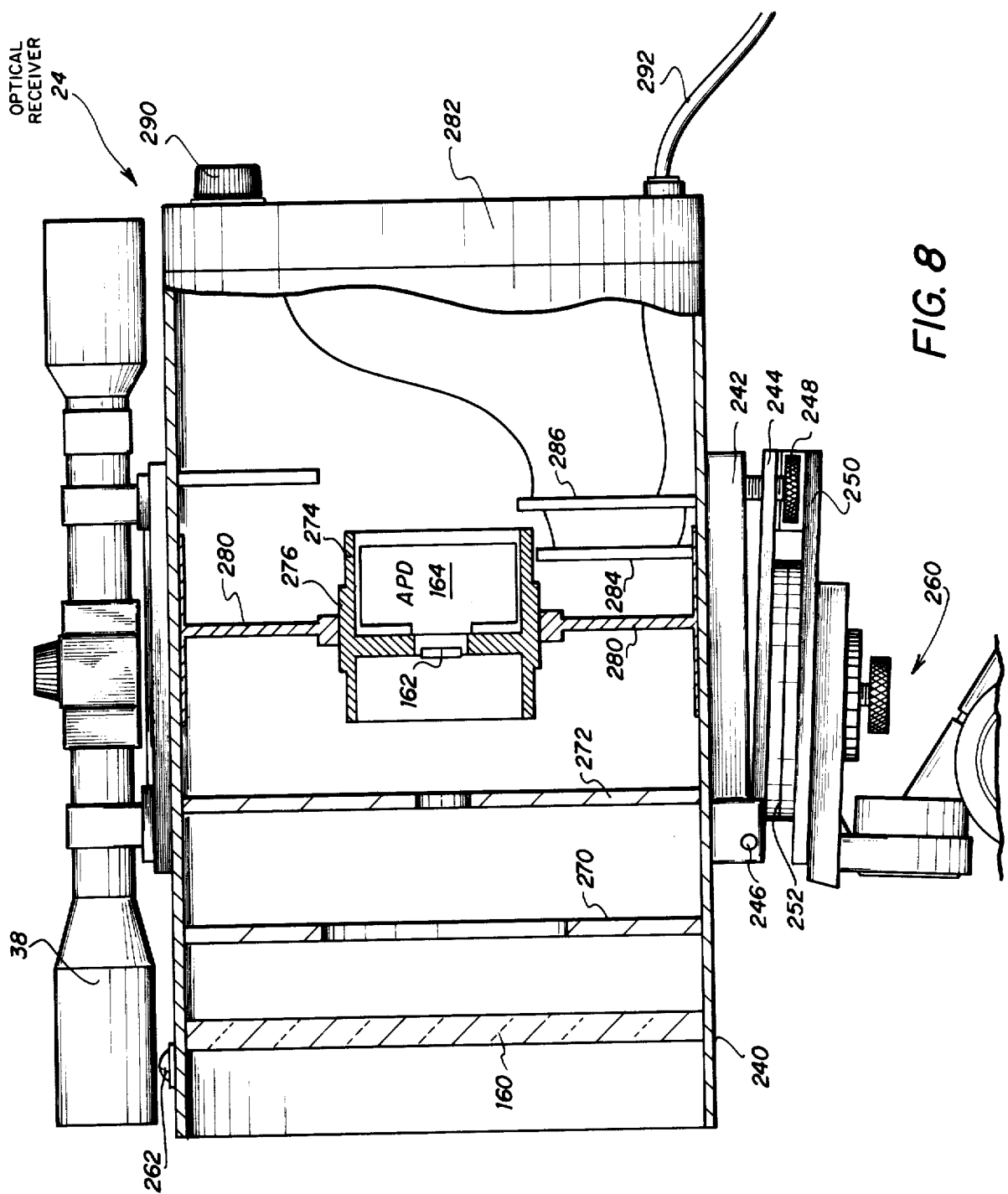
FIG. 8 is a partially sectioned view of the receiver of the invention.

FIGS. 7 and 8 illustrate in greater detail the receiver housing of the invention. The receiver housing 24 comprises a circular housing 240 which includes the telescopic sight 38 mounted on the top thereof. An important aspect of the invention is an X-Y positioning system mounted on the bottom of the housing 240. A base 242 is rigidly mounted to the bottom of the housing 240. A first housing 244 is pivotally mounted to the base 242 by a horizontal pivot 246. Housing 244 is then mounted for vertical movement relative to the base 242. A set screw 248 is threadedly mounted in the housing 244 and abuts against the bottom of base 242. Adjustment of the screw 246 thus causes relative vertical adjustment of the housing 240 and the housing 244.

Referring to FIG. 7, a second housing 250 is mounted below housing 244 by a two piece cylindrical pivot member 252 which enables rotation of the housing 250 about a vertical axis about housing 250. Housing 250 includes a flange 254 which includes a screw 256 threadedly mounted therein. Rotation of the screw 256 causes the end of the screw 256 to abut a flange 258 extending from the housing 244, thereby causing rotation to occur in the cylindrical pivot member 252. A conventional transit mounting 260 is rigidly attached below the second housing 250. Thus, by selective adjustment of the set screws 248 and 256, the receiving housing 240 may be accurately positioned in any desired position to receive the transmitted light beam. A beacon 262 is mounted on the top of the housing 240 in order to provide a flashing camera strobe light to enable easy sighting of the housing at the remote transmitter site.

The Fresnel lens 160 is mounted in the front of the housing. Aluminum light baffles 270 and 272 are provided with central apertures in order to reduce interference of ambient light. The light is focused on the dye filter 162 which is mounted in a metal housing 274. The avalanche photodiode 164 is mounted in the rear of the housing 274. Housing 274 includes a key 276 which is keyed to slots in a three leg spider mount 280 which supports the housing 274 in the center of the housing 240. An important aspect of the present invention is that housing 274 is frictionally keyed within the spider mount 280, but may be selectively moved relative to the spider mount 280 in order to allow adjustment of the distance between the photodiode 164 and the Fresnel lens 160.

Such adjustment is accomplished by removal of a back panel 282, thereby exposing the electronic circuitry of the housing for maintenance and also allowing selective adjustment of the position of the photodiode 164. A semicircular printed circuit board 284 is mounted to contain a portion of the circuitry shown in FIG. 5, while the remainder of the electronic circuitry shown in FIG. 5 is contained on a circular printed circuit board 286. Printed circuit boards 284 and 286 have central apertures to allow access to the photodiode 164.

Gain control adjustment of the system is accomplished by rotation of a knob 290. Electrical power for the unit is provided through an electrical cord 292. Typical dimensions for the receiver unit shown in FIGS. 7 and 8 comprise a diameter of 7½ inches and a length of approximately 12 inches, with a weight of approximately 13 pounds. The receiver provides a noise equivalent irradiance of $4.5 \times 10^{-11} w/cm^2$ and a field of view of ¼°. The receiver is provided with a bandwidth of 30 Hz – 20 MHz and a dynamic range of 50 dB at 1,000 feet.

Whereas the present invention has been described with respect to specific embodiments thereof, it will be understood that various changes and modifications will be suggested to one skilled in the art, and it is intended to encompass such changes and modifications as fall within the scope of the appended claims.

We claim:
1. A wireless communications link comprising:
   a transmitter housing having means for receiving electrical audio and video signals,
   means for generating a beam of light mounted in said transmitter housing,
   means responsive to said receiving means for modulating said beam of light with said audio and video signals,
   a first lens mounted in said transmitter housing in the path of said beam of light for focusing said modulated beam of light,
   a receiver housing having a second lens disposed for receiving and focusing said beam of light,
   a photodiode mounted in said receiver housing for generating electrical output signals in response to said beam of light,
   circuitry responsive to said electrical output signals for reconstructing said audio and video signals,
   an X-Y adjustment platform mounted on the bottom of said receiver housing, said adjustment platform including a first member horizontally hinged to the bottom of said receiver housing for vertical movement, means for adjusting the angle between said first member and said receiver housing, a second member pivotally mounted below said first member for rotation about a generally vertical axis, and means for adjusting the relative positions of said first and second members.

2. A wireless communications link comprising:

a transmitter housing having means for receiving electrical audio and video signals, means for generating a beam of light mounted in said transmitter housing, means responsive to said receiving means for modulating said beam of light with said audio and video signals, a first lens mounted in said transmitter housing in the path of said beam of light for focusing said modulated beam of light, a receiver housing having a second lens disposed for receiving and focusing said beam of light, a photodiode mounted in said receiver housing for generating electrical output signals in response to said beam of light, circuitry responsive to said electrical output signals for reconstructing said audio and video signals, a removable rear cover for said receiver housing to allow access to said photodiode, said photodiode supported within a rigid frame member, said frame member slidably mounted within said receiver housing to enable adjustment of the position of said photodiode within said receiver housing, wherein said frame member is keyed to prevent rotation of said photodiode relative to said receiver housing.

3. A wireless communications link comprising:

a transmitter housing having means for receiving electrical audio and video signals, means for generating a beam of light mounted in said transmitter housing, means responsive to said receiving means for modulating said beam of light with said audio and video signals, a first lens mounted in said transmitter housing in the path of said beam of light for focusing said modulated beam of light, a receiver housing having a second lens disposed for receiving and focusing said beam of light, a photodiode mounted in said receiver housing for generating electrical output signals in response to said beam of light, circuitry responsive to said electrical output signals for reconstructing said audio and video signals, a removable rear cover for said receiver housing to allow recess to said photodiode, said photodiode supported within a rigid frame member, said frame member slidably mounted within said receiver housing to enable adjustment of the position of said photodiode within said receiver housing, wherein each of said transmitter and receiver housings are of weathertight construction and are dimensioned to be hand-held and portable.

4. An optical transmitter comprising:

means for receiving video signals, means for receiving audio signals, a voltage controlled oscillator coupled to said receiving means responsive to said audio signals for generating a modulated frequency output, summing means for summing said video signals and said modulated frequency output, means responsive to the output of said summing means for generating current drive, a light emitting diode connected to receive said current drive and to generate a modulated light beam in response thereto, lens means for focusing said light beam, and a preemphasis circuit connected between said summing means and said means for generating current drive to preemphasize high frequencies of said current drive in order to provide optimum modulation characteristics for said video signals.

5. A wireless communications link comprising:

a transmitter housing having means for receiving electrical audio and video signals, means for generating a beam of light mounted in said transmitter housing, means responsive to said receiving means for modulating said beam of light with said audio and video signals, a first lens mounted in said transmitter housing in the path of said beam of light for focusing said modulated beam of light, a receiver housing having a second lens disposed for receiving and focusing said beam of light, a photodiode mounted in said receiver housing for generating electrical output signals in response to said beam of light, circuitry responsive to said electrical output signals for reconstructing said audio and video signals, and an X-Y adjustment platform mounted on the bottom of said receiver housing.

6. A wireless communications link comprising:

a transmitter housing having means for receiving electrical audio and video signals, means for generating a beam of light mounted in said transmitter housing, means responsive to said receiving means for modulating said beam of light with said audio and video signals, a first lens mounted in said transmitter housing in the path of said beam of light for focusing said modulated beam of light, a receiver housing having a second lens disposed for receiving and focusing said beam of light, a photodiode mounted in said receiver housing for generating electrical output signals in response to said beam of light, circuitry responsive to said electrical output signals for reconstructing said audio and video signals, a removable rear cover for said receiver housing to allow access to said photodiode, said photodiode supported within a rigid frame member, and said frame member slidably mounted within said receiver housing to enable adjustment of the position of said photodiode within said receiver housing.

* * * * *